United States Patent
Melton et al.

(10) Patent No.: US 10,671,967 B2
(45) Date of Patent: Jun. 2, 2020

(54) DELIVERY VEHICLE CONFIGURATIONS AND CORRESPONDING METHODS

(71) Applicant: Walmart Apollo, LLC, Bentonville, AR (US)

(72) Inventors: Kerry D. Melton, Springdale, AR (US); Sai Phaneendra Sri Harsha Viswanath Putcha, Bentonville, AR (US)

(73) Assignee: Walmart Apollo, LLC, Bentonville, AR (US)

(*) Notice: Subject to any disclaimer, the term of this patent is extended or adjusted under 35 U.S.C. 154(b) by 417 days.

(21) Appl. No.: 15/581,507

(22) Filed: Apr. 28, 2017

(65) Prior Publication Data

US 2017/0316378 A1    Nov. 2, 2017

Related U.S. Application Data

(60) Provisional application No. 62/329,484, filed on Apr. 29, 2016.

(51) Int. Cl.
*G06Q 10/08* (2012.01)

(52) U.S. Cl.
CPC ................ *G06Q 10/0838* (2013.01)

(58) Field of Classification Search
CPC .... G06Q 10/08; G06Q 50/30; G06Q 10/0833; G06Q 10/087; G06Q 10/083; G06Q 10/08355; G06Q 20/4016; G06Q 50/28; G06Q 10/063114; G06Q 10/06398; G06Q 10/0835; G06Q 10/0838
See application file for complete search history.

(56) References Cited

U.S. PATENT DOCUMENTS

| | | | |
|---|---|---|---|
| 7,624,024 B2* | 11/2009 | Levis | G06Q 10/08 705/1.1 |
| 2003/0195043 A1* | 10/2003 | Shinners | G07F 17/32 463/42 |
| 2006/0235739 A1 | 10/2006 | Levis | |
| 2007/0050108 A1 | 3/2007 | Larschan | |
| 2008/0221966 A1 | 9/2008 | Backsen | |
| 2009/0125425 A1 | 5/2009 | Kloostra | |
| 2012/0166346 A1 | 6/2012 | Hass Machlab | |

(Continued)

OTHER PUBLICATIONS

"Keep Truckin Electronic Logs;" KeepTruckin; http://keeptruckin.com/tour; Dec. 15, 2015; pp. 1-14.

(Continued)

*Primary Examiner* — Kevin H Flynn
*Assistant Examiner* — Michelle E Carey
(74) *Attorney, Agent, or Firm* — Fitch, Even, Tabin & Flannery LLP

(57) ABSTRACT

A delivery vehicle containing items to be delivered to a plurality of target recipients at different delivery addresses also includes a mobile user interface configured to be disposed within and carried by the delivery vehicle, the mobile user interface presenting an interactive display having discrete information fields for identifying information corresponding to the target recipients, predetermined delivery windows corresponding to each of at least some of the target recipients, and actual delivery-time information corresponding to each of at least some of the target recipients.

14 Claims, 9 Drawing Sheets

(56) References Cited

U.S. PATENT DOCUMENTS

| | | | |
|---|---|---|---|
| 2012/0246039 A1* | 9/2012 | Fain | G06Q 10/08 705/32 |
| 2015/0046298 A1* | 2/2015 | Zwakhals | G06Q 10/087 705/28 |
| 2015/0241873 A1* | 8/2015 | Goldenberg | G05B 19/048 700/97 |
| 2015/0347964 A1 | 12/2015 | Taylor | |

OTHER PUBLICATIONS

"Reduce Violations with Digital Inspections;" Teletrac; http://www.teletrac.com/fleet-management-software/driver-tracking/dvir; Dec. 15, 2015; pp. 1-8.

"TRIPLOG: Vehicle Mileage Log Tracking, Business Expense, Fleet Management Apps and Web Services;" TRIPLOG; http://triplogmileage.com/; Dec. 15, 2015; pp. 1-4.

"Trucking Trip Sheet Form Mobile App;" Canvas; http://www.gocanvas.com/mobile-forms-apps/6860-Trucking-Trip-Sheet; Dec. 15, 2015; pp. 1-12.

PCT; App. No. PCT/US17/30098; International Search Report and Written Opinion dated Jul. 18, 2017; pp. 1-12.

* cited by examiner

| DAILY TRIP SHEET -- Penske Logistics -- Walmart To Go | | | | | |
|---|---|---|---|---|---|
| Location | 2125 | MILEAGE END | 66067 | Load # | 13.5 | Late Reasons: Mechanical Breakdown |
| Date | 11-1-15 | MILEAGE START | 65944 | Clock in Time | 8:10 | Accidently Loaded Late, Weather, Traffic |
| Driver | Pedro Rascon | | | Clock out Time | 9:35 | Misloaded totes, Driver Error |
| Truck # | 8840018 | | 123 | TOTAL HOURS | 13.5 | |
| Finished loading | 9:26 / 1:11 / 6:37 | Departed | 9:28 / 1:15 / 6:38 | | | |

| | Stops | CUSTOMER | Time In | Time Out | Mileage | Customer Delivery Window | ON TIME YES OR NO | Totes Deliv | LATE REASON (if late select from list below) |
|---|---|---|---|---|---|---|---|---|---|
| | | Lakewood | 8:10 | 9:28 | 65944 | | | | |
| 111 | 1 | L – Hutchins | 9:37 | 9:45 | 65949 | 8-10 | Yes | 3 | |
| 112 | 2 | J – Goldstein | 9:55 | 10:08 | 65951 | 9-11 | Yes | 7 | |
| 113 | 3 | A – Medlock | 10:14 | 10:35 | 65952 | 10-12 | Yes | 7 | Was not home, came back |
| 114 | 4 | G – Jay | 11:06 | 11:20 | 65955 | 10-12 | Yes | 10 | |
| 115 | 5 | S – Maloney | 11:38 | 11:53 | 65960 | 10-12 | Yes | 8 | |
| 116 | 6 | H – Wilson | 12:10 | 12:17 | 65966 | 11-1 | Yes | 3 | |
| 117 | 7 | K – Protze | 12:33 | 12:39 | 65974 | 12-4 | Yes | 9 | |
| | 8 | WM2125 | 12:45 | 1:15 | 65976 | | | | |
| 126 | 9 | R – Reeves | 1:27 | 1:35 | 65982 | 12-2 | Yes | 9 | |
| 127 | 10 | B – Brennan | 1:47 | 1:57 | 65984 | 12-6 | Yes | 7 | Ok, early |
| 128 | 11 | M – Coffe | 2:26 | 2:37 | 65998 | 12-4 | Yes | 7 | |
| 129 | 12 | M – DuPaui | 3:00 | 3:12 | 66007 | 4-6 | Yes | 8 | Ok, really happy, early |
| 130 | 13 | J – Isaac | 3:53 | 4:03 | 66019 | 5-7 | Yes | 8 | Okay, happy, early |
| | 14 | Gas Station | 3:25 | 3:32 | 66010 | | | | |
| | 15 | Lunch | 4:30 | 5:01 | 66026 | | | | |
| | 16 | WM2125 | 5:41 | 6:38 | 66033 | | | | |
| 149 | 17 | M – Umbach | 6:58 | 7:17 | | 5-7 | Yes | 6 | |
| 150 | 18 | J – Ernst | 7:44 | 7:52 | 66053 | 6-8 | Yes | 5 | |
| 151 | 19 | L – Harrison | 8:05 | 8:18 | 66056 | 7-9 | Yes | 7 | |
| 152 | 20 | G – Richardson | 8:34 | 8:45 | 66061 | 5-9 | Yes | 6 | |
| | 21 | WM-2125 | 8:59 | 9:35 | 66067 | | | | |
| | | | | | | REMINDER!!!!!! DOWNLOAD BEFORE YOU LEAVE AND FINISH WHEN YOU RETURN | | | |
| | 1ST Lunch – must be taken within 7 hours of your start time | | | | | | | | If you work over 6 hours a lunch will be taken out regardless |

Electronic Driver Trip Sheet

| Location | | Mileage End | |
|---|---|---|---|
| Date | | Mileage Start | |
| Driver | | Load # | |
| Truck # | | Clock-In Time | |
| | | Clock-Out Time | |
| Finished Loading Time | | Total Hours | |
| Store Departure Time | | | |

| Stop # | Customer | Time-In | Time-Out | Mileage | Delivery Window | Totes Delivered |
|---|---|---|---|---|---|---|
| | 501 | 503 | 503 | 504 | 502 | 505 |

*FIG. 5*

Electronic Driver Trip Sheet

Location           Mileage End           Load #

Date                 Mileage Start          Clock-In Time

Driver                                  Clock-Out Time

Truck #                            Total Hours

Finished Loading Time       Store Departure Time

| Stop # | Customer | Time-In | Time-Out | Mileage | Delivery Window | Totes Delivered |
|---|---|---|---|---|---|---|
| 1 | ABC | | | | | |
| 2 | DEF | | | | | |
| 3 | GHI | | | | | |
| 4 | JKL | | | | | |

*FIG. 6*

Electronic Driver Trip Sheet

Location            Mileage End            Load #

Date                Mileage Start           Clock-In Time

Driver                                   Clock-Out Time

Truck #                             Total Hours

Finished Loading Time      Store Departure Time

| Stop # | Customer | Time-In | Time-Out | Mileage | Delivery Window | Totes Delivered |
|---|---|---|---|---|---|---|
| 1 | DEF | | | | | |
| 2 | GHI | | | | | |
| 3 | ABC | | | | | |
| 4 | JKL | | | | | |

*FIG. 7*

Electronic Driver Trip Sheet

Location          Mileage End          Load #

Date              Mileage Start        Clock-In Time

Driver                                 Clock-Out Time

Truck #                                Total Hours

Finished Loading Time    Store Departure Time

| Stop # | Customer | Time-In | Time-Out | Mileage | Delivery Window | Totes Delivered |
|--------|----------|---------|----------|---------|-----------------|-----------------|
| N      | XYZ      |         |          |         |                 |                 |

*FIG. 8* under"US 10,671,967 B2"
DELIVERY VEHICLE CONFIGURATIONS AND CORRESPONDING METHODS

CROSS-REFERENCE TO RELATED APPLICATION

This application claims the benefit of U.S. Provisional Application No. 62/329,484, filed Apr. 29, 2016, which is incorporated herein by reference in its entirety.

TECHNICAL FIELD

These teachings relate generally to delivery vehicles.

BACKGROUND

Delivery vehicles of various kinds are known in the art. Examples include a variety of automobiles, so-called minivans, full-size vans and panel trucks, a variety of trucks, and trailers as well as bicycles, scooters, and motorcycles, to note but a few examples in these regards. Though typically powered by an on-board motor or engine, some delivery vehicles are human powered. As used herein, a "delivery vehicle" will be understood to carry at least one delivery person regardless of whether the vehicle itself is driven by a human or is partially or wholly autonomously navigated and driven.

In many cases a given delivery vehicle carries a plurality of items that are to be delivered to a corresponding plurality of target recipients at different delivery addresses. Accordingly, the on-board delivery person is typically responsible for delivering all of the conveyed items to all of the intended target recipients during a single delivery run.

Delivery trip sheets are often utilized to schedule and/or track the deliveries for a given delivery vehicle during a given delivery run. Delivery trip sheets can help the delivery person ensure the proper and timely delivery of the conveyed items and can also help dispatching managers analyze and understand how successfully the intended schedules are being met. Unfortunately, prior art delivery trip sheets often give rise to a variety of related problems. Examples of problems include time requirements, legibility, incorrectly entered data, and so forth.

BRIEF DESCRIPTION OF THE DRAWINGS

The above needs are at least partially met through provision of the delivery vehicle configurations and corresponding methods described in the following detailed description, particularly when studied in conjunction with the drawings, wherein:

FIGS. 1A and 1B comprise a top plan view as configured in accordance with the prior art;

FIG. 5 comprises a screen shot as configured in accordance with various embodiments of these teachings;

FIG. 6 comprises a screen shot as configured in accordance with various embodiments of these teachings;

FIG. 7 comprises a screen shot as configured in accordance with various embodiments of these teachings;

FIG. 8 comprises a screen shot as configured in accordance with various embodiments of these teachings.

Figure 2:
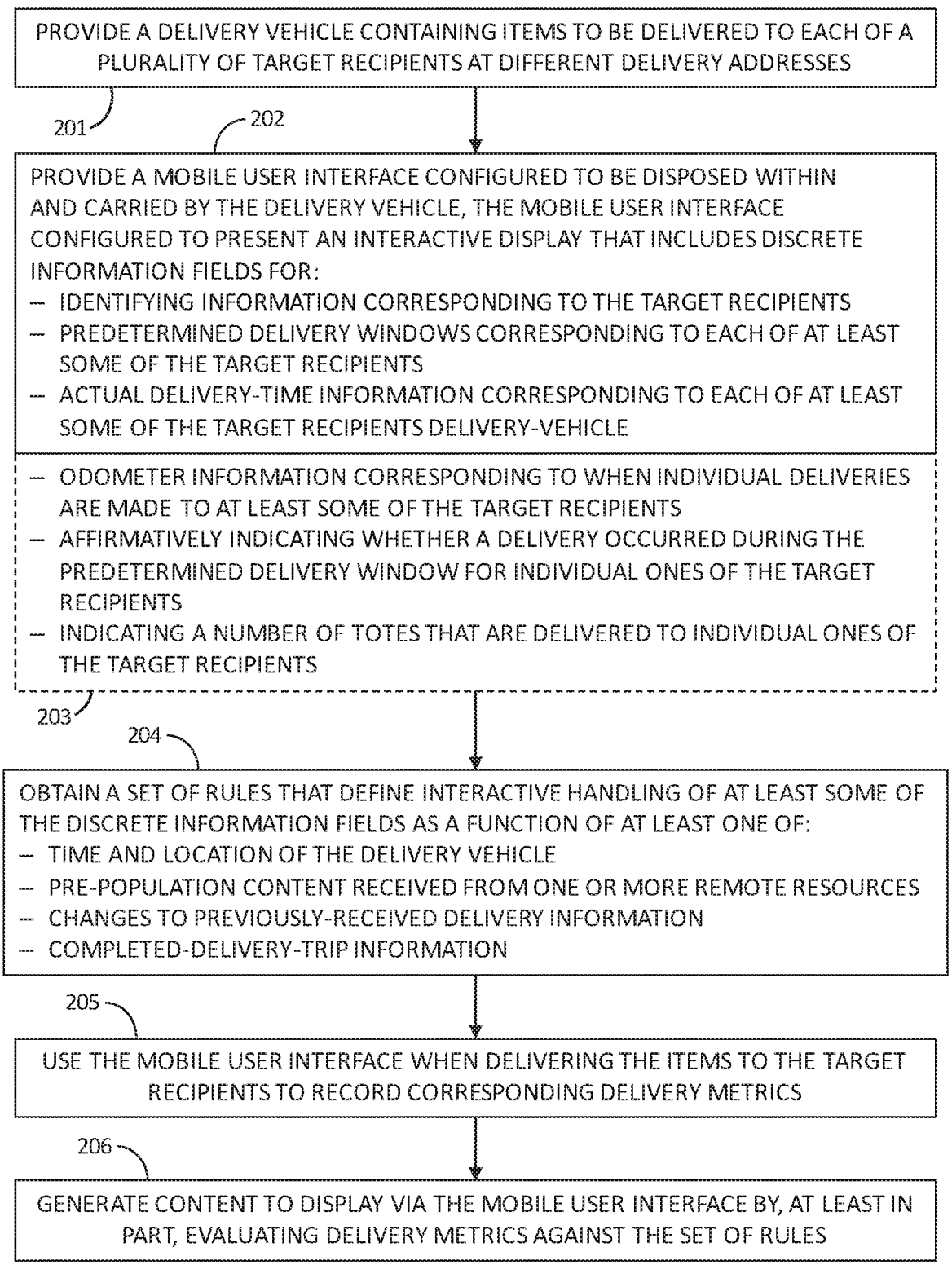
FIG. 2 comprises a flow diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments a delivery vehicle containing items to be delivered to a plurality of target recipients at different delivery addresses also includes a mobile user interface configured to be disposed within and carried by the delivery vehicle, the mobile user interface presenting an interactive display having discrete information fields for identifying information corresponding to the target recipients, predetermined delivery windows corresponding to each of at least some of the target recipients, and actual delivery-time information corresponding to each of at least some of the target recipients.

By one approach at least some of the information presented in the aforementioned content has been pre-populated prior to making, for example, a first delivery of any of the aforementioned items.

By another approach, if desired, the displayed information can include completed-delivery-trip information (including such information as may be provided by the mobile interface to a remote resource).

Other potentially useful discrete information fields include fields for delivery-vehicle odometer information corresponding to individual deliveries being made to at least some of the target recipients, affirmatively indicating whether a delivery occurred during the predetermined delivery window for individual ones of the target recipients, and/or indicating a number of totes that are delivered to individual ones of the target recipients.

So configured, these teachings can help reduce or even eliminate the need for paper trip sheets. Properly configured and utilized these teachings can also significantly reduce required interaction time on the part of the delivery person. Legibility and accuracy can also be significantly improved. These teachings also greatly facilitate the ability of managers to assess whether customer delivery requirements, such as requested delivery windows, are being met.

These and other benefits may become clearer upon making a thorough review and study of the following detailed description. First, however, it may be helpful to first present and consider a not untypical example of a prior art trip sheet.

FIGS. 1A and 1B present an example of a prior art trip sheet 100. This prior art trip sheet 100 comprises a paper document having numerous fields that must be completed by hand (in fact, via handwriting). So configured, there are numerous opportunities for missing information and/or illegibility to reduce the value of such a record. It can also be difficult to later transpose or otherwise enter this information in any direct fashion to an electronic data store and that, in turn, can make it difficult to analyze such information, alone or in context with similar records, in any convenient or accurate manner. It will also be appreciated that constantly pausing to enter such information can actually contribute to distracting and/or delaying the delivery person and that it can be difficult to compare actual time in/out time to planned time in/out time for each delivery stop.

FIG. 2 presents an illustrative process 200 that is compatible with many of the present teachings.

Figure 3:
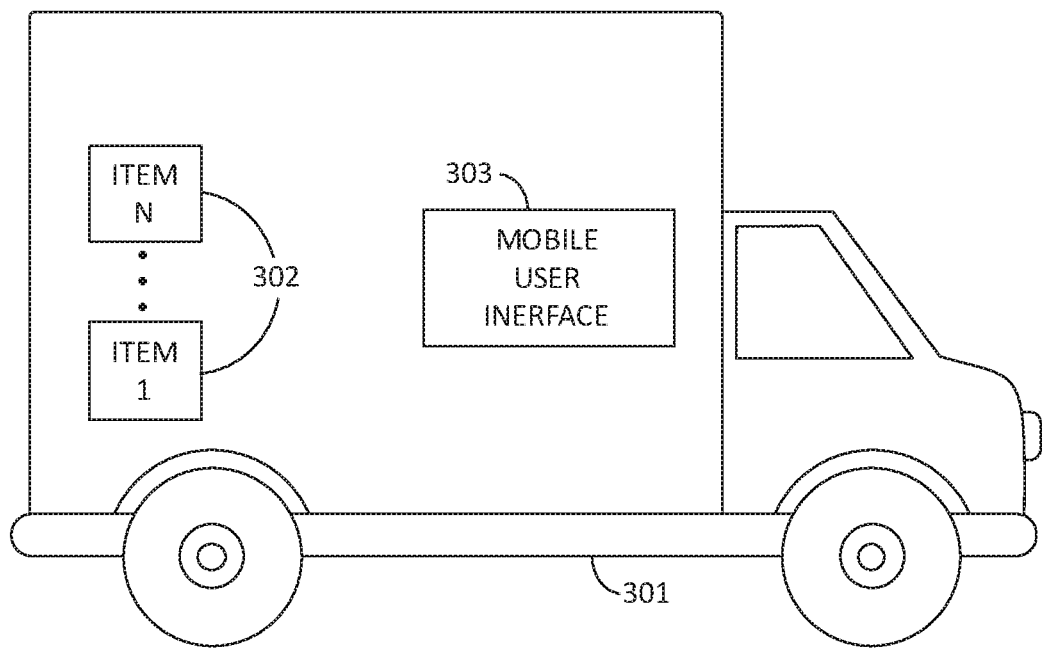
FIG. 3 comprises a block diagram as configured in accordance with various embodiments of these teachings.

At block 201 this process 200 provides a delivery vehicle that contains items to be delivered to each of a plurality of target recipients at different delivery addresses. FIG. 3 presents an illustrative example in these regards. In this example the delivery vehicle 301 comprises a delivery truck. Notwithstanding the specifics of this example, those skilled in the art will appreciate that the present teachings are readily employed in conjunction with any of a wide variety of delivery vehicle types.

This delivery truck includes a cargo-carrying area containing the aforementioned items 302 (denoted here as item 1 through item N, where "N" is an integer greater than 1). These items 302 may comprise totes, where a tote could be a box containing one or more products, a bag containing one or more products, a plastic tub containing one or more products or bags that themselves contain products, and so forth. These items 302 may have all been placed in the delivery vehicle 301 during a single loading activity at a single loading point (such as a loading dock at a retail shopping facility, a distribution center, a warehouse, and so forth). These teachings will also accommodate placing some of these items 302 in the delivery vehicle 301 during different discrete loading activities (either at a single loading point or at a plurality of different loading points).

Figure 4:
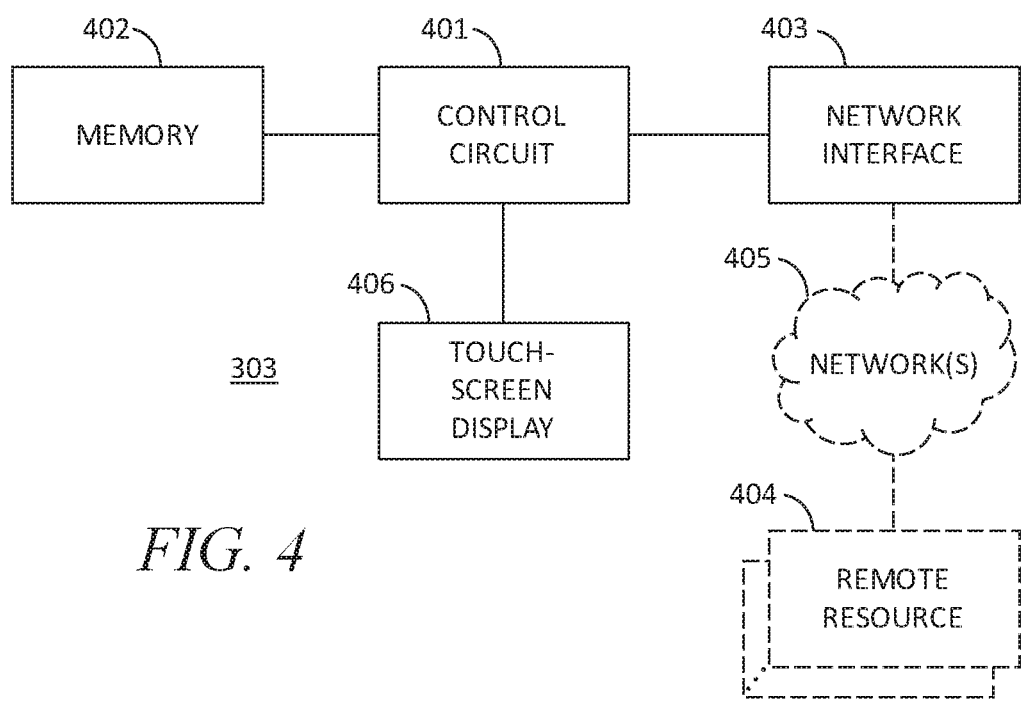
FIG. 4 comprises a block diagram as configured in accordance with various embodiments of these teachings.

With continued reference to FIGS. 2 and 3, and now also with reference to FIG. 4, at block 202 this process 200 provides a mobile user interface 303 configured to be disposed within and carried by the delivery vehicle 303. This mobile user interface 303 may be partially or wholly disposed within the cargo-carrying area of the delivery vehicle 301 and/or within the driver/passenger-containing area of the delivery vehicle 301 as desired. This mobile user interface 303 may be configured as or at least include a tablet-style computer as is known in the art.

In this particular example, the user interface 303 includes a control circuit 401. Being a "circuit," the control circuit 401 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 401 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 401 is configured (for example, by using corresponding programming as will be well understood by those skilled in the art) to carry out one or more of the steps, actions, and/or functions described herein.

In this example the control circuit 401 operably couples to a memory 402. This memory 402 may be integral to the control circuit 401 or can be physically discrete (in whole or in part) from the control circuit 401 as desired. This memory 402 can also be local with respect to the control circuit 401 (where, for example, both share a common circuit board, chassis, power supply, and/or housing) or can be partially or wholly remote with respect to the control circuit 401 (where, for example, the memory 402 is physically located in another facility, metropolitan area, or even country as compared to the control circuit 401).

In addition to various items of information regarding the items to be delivered, the target recipients, various delivery parameters, and so forth, this memory 402 can serve, for example, to non-transitorily store the set of rules that, when executed by the control circuit 401, cause the control circuit 401 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

In this example the control circuit 401 also operably couples to a network interface 403. So configured the control circuit 401 can communicate with other elements such as one or more remote resources 404 via one or more intervening communications/data networks 405. Network interfaces, including both wireless and non-wireless platforms, are well understood in the art and require no particular elaboration here.

Also in this example the control circuit 401 operably couples to a touch-screen display 406. So configured the mobile user interface 303 can visually present information to a user and also receive information and/or instructions from a user via the touch-screen display 406. More particularly, the control circuit 401 can use the mobile user interface 303 when delivering the items to the target recipients to record corresponding delivery metrics and to generate content to display via the mobile user interface 303 by, at least in part, evaluating recorded delivery metrics (and other content) against a set of rules (described in more detail herein).

Referring now as well FIG. 5, and with continued reference to block 202 of the described process 200, the mobile user interface 300 is configured to present an interactive display (via, in this example, the touch-screen display 406) comprising an electronic driver trip sheet 500. This electronic driver trip sheet 500 includes a plurality of discrete information fields.

A first set 501 of these discrete information fields provides for identifying information corresponding to the target recipients for the items 302 to be delivered. This identifying information can comprise, for example, the family name (i.e., the last name in Western cultures) of the recipient, alone or in combination with one or more given names or initials of the recipient.

A second set 502 of these discrete information fields presents information regarding predetermined delivery windows corresponding to each of at least some of the target recipients. For example, a delivery window may be expressed as a range of hours such as "8-10" or "10-12." As another example, a delivery window may be expressed verbally such as "early-morning" or "afternoon." A "delivery window" is a period of time within which a particular item is to be delivered to a particular target recipient. The delivery window may be specified and/or agreed to by the recipient or may simply be assigned by the enterprise that seeks to deliver the item in accordance with some planned schedule.

A third set 503 of these discrete information fields presents information regarding actual delivery-time information corresponding to at least some of the target recipients. In this particular example this includes information fields to represent the "time-in" and information fields to represent the "time-out" as regards the delivery vehicle's arrival and departure times at various ones of the recipient addresses. As another example the actual delivery-time information could be only one of these information types.

By one approach the delivery person enters the relevant delivery-time information via, for example, the touch-screen display 406. By another approach, the control circuit 401 automatically enters such information as a function, for example, of the present time of day and location information as provided, for example, by an available global positioning system (GPS) receiver (not shown). In that case, for example, the control circuit 401 can determine when the delivery vehicle 301 has stopped at a particular target recipient's address and when the delivery vehicle 301 has left that address after presumably delivering the corresponding item.

By one approach the control circuit 401 communicates with one or more remote resources 404 to receive information that the control circuit 401 uses to pre-populate one or more of the aforementioned discrete information fields. For example, the identifying information corresponding to the target recipients and/or the predetermined delivery window information can be received from a remote resource 404 and pre-populated to appear in the appropriate information fields described above. So configured, this important information is available to the delivery person via the touch-screen display 406 prior to beginning any particular delivery.

When the network interface 403 comprises, at least in part, a wireless network and, these teachings will also accommodate making running updates with respect to one or more of the following items of information. For example, if a target recipient indicates that they are not going to be available after all to receive a delivery today, the displayed information can be updated to reflect that circumstance. As another example, if a target recipient indicates that they are not available to receive a delivery during a previously agreed-to delivery window but is available at a different time, the delivery window information for that particular target recipient can be updated accordingly. In that case, if desired, the presentation of the target recipient's information can also be automatically modified to place the modified target recipient information into a proper temporally-sequenced order based upon the new delivery window.

In addition to the foregoing, or in lieu thereof, when the network interface 403 includes a wireless communications, these teachings will also accommodate having the control circuit 401 communicate to one or more remote resources 404 information regarding completed-delivery-trip information. By one approach such information can be transmitted in batches (for example, by communicating information regarding all completed deliveries during a one-hour window of time at the conclusion of that hour) and/or anecdotally (for example, by communicating information regarding a particular delivery soon after completing that particular delivery).

These teachings will accommodate including other discrete information fields with some examples being shown at block 203. For example, a fourth set 504 of these discrete information fields presents delivery-vehicle odometer information corresponding to when individual deliveries are made to at least some of the target recipients. By one approach the delivery person enters that information via the touch-screen display 406. By another approach, the control circuit 401 operably couples to the delivery vehicle 301, either wirelessly or non-wirelessly, and receives odometer information directly from the delivery vehicle 301. In that case the control circuit 401 can determine when the delivery vehicle 301 has arrived at a particular target recipient's address and automatically enter the current odometer reading into the corresponding discrete information field.

As yet another illustrative example in these regards, a fifth set 505 of these discrete information fields presents information indicating a number of totes delivered to individual ones of the target recipients. For example, if a delivered item 302 comprises a box containing three different individual products, the number "1" would be an appropriate entry since only a single overall box (i.e., "tote") was delivered notwithstanding that the box contained a plurality of individual items.

These teachings will accommodate any number of other modifications as may be desired. As one illustrative example in these regards, discrete information fields can be provided that contain information affirmatively indicating whether a particular delivery occurred during the predetermined delivery window for that particular delivery. For example, such a field could contain either the word "yes" or "no" to properly represent that circumstance.

At block 204 the control circuit 401 obtains a set of rules that define interactive handling of at least some of the aforementioned discrete information fields (or other fields) as a function of any of a variety of other content/data points. Examples include but are not limited to time and location of the delivery vehicle 301 (as determined, for example, by on-board components that comprise a part of the delivery vehicle 301 and that communicate their data to the control circuit 401 via a wired or wireless interface of choice, or by components that comprise a part of the mobile user interface 303 itself such as a global positioning system component (not shown)), pre-population content received from one or more remote resources 404 (that is, content that is received prior to presenting information in these regards via the display 406), changes to previously-received delivery information (for example, as entered by the delivery person and/or as received from a remote resource 404 during the course of the delivery run), completed-delivery-trip information (again as possibly entered by the delivery person and/or as received from a remote resource 404), and so forth. This set of rules can include rules to, for example, update time-in, time-out, and mileage fields for a particular customer as a function of the vehicle's location. As a salient example in these regards, the control circuit 401 can compare the delivery vehicle's present location to a known address for a given one of the customers to determine when the delivery vehicle has arrived at the customer's address and to then automatically enter a present time into the time-in field. A current (aggregate or partial) mileage metric can be similarly automatically calculated as corresponds to this particular customer and automatically entered into the mileage field. And a then-current time can be entered into the time-out field upon detecting that the delivery vehicle 303 is now again moving, and moving away from the last customer's address.

As noted above, these teachings will accommodate automatically determining and/or entering one or more of the above-described items of information. As also noted above, and as shown at block 205, the mobile user interface 303 can be utilized by the delivery person, during the course of delivering the aforementioned items 302 to their corresponding target recipients, to enter one or more of these items of information to thereby facilitate recording those corresponding delivery metrics. As one example, it may be required that the delivery person personally enter a particular data field entry rather than providing for an automatically-determined entry.

As another example in these regards, the delivery person may be allowed an opportunity to change/correct an automatically-entered entry. As an illustrative example in these regards, the above-described approach may automatically enter a rules-based "time-in" entry that the delivery person knows to be in error (for example, by being premature). In such a case the delivery person can be permitted to change the automatically-entered value. If desired, limits can be placed on the delivery person's ability to make such a change. For example, such a change may only be permitted if entered within some predetermined period of time (such as five minutes, fifteen minutes, or some other duration of choice) of when the automatically-determined and entered value is first displayed. As another example, in lieu of the foregoing or in combination therewith, such a change may be limited to no more than some percentage or differential value as compared to the original entry. By way of an illustrative example, the delivery person may only be permitted to adjust a time-of-day entry by, say, five minutes or ten minutes one way or the other (i.e., plus or minus).

At block 206 this process 200 provides for the control circuit generating content to display via the mobile user interface by, at least in part, evaluating delivery metrics against the aforementioned set of rules. (This activity of block 206 can precede and/or follow the activity described in block 205 as desired.) Accordingly, the control circuit can employ automatically-captured delivery metrics (such as time of day, location, and so forth) and/or driver-entered delivery metrics in conjunction with the rules to automatically calculate the particular information to be presented on the display as part of the electronic driver trip sheet 500.

By one approach, the delivery person can interact with the electronic driver trip sheet 500 via the touch screen display 406 to move and hence rearrange and thereby reschedule the delivery stops. FIGS. 6 and 7 provide a simple illustrative example in these regards.

FIG. 6 presents an electronic driver trip sheet 500 having four scheduled stops. These four stops are presently scheduled such that customer ABC is the first stop, customer DEF is the second stop, customer GHI is the third stop, and customer JKL is the fourth and final stop. The delivery person utilizes, for example, an on-screen cursor 601 or other selection tool to select the first stop/customer ABC. A successful selection may be accomplished, for example, by a double tap or any number of other input mechanisms of choice and may be indicated, for example, by highlighting the selected row 602 using a contrasting color, shade, or other visually-distinguishing indicator.

The delivery person then drags the selected row 602 (as indicated generally by reference numeral 603) to place that row at the desired location. In this example the desired destination for the selected row is between the third and fourth stops as originally scheduled. FIG. 7 presents the electronic driver trip sheet 500 as now reconfigured by the delivery person per the foregoing interactions. In this example the stops are not only reordered but the designated number of the stop is updated for each of the stops (such that, for example, stop 1 is now customer DEF and stop 2 is now customer GHI).

By one approach the system determines whether the foregoing rescheduling is unworkable for some reason. The above-described control circuit 401 and/or one or more of the above-described remote resources 404 can make this determination alone or in conjunction with one another. This determination can be based upon rules that assess workability in terms of, for example, current or projected travel distances, traffic congestion/delays, specified delivery windows, accessibility of the items to be delivered (where, for example, a given item cannot be physically accessed in the delivery vehicle 301 until another of the items to be delivered is removed from the vehicle), and so forth.

By one approach, upon determining that the proposed rescheduling is nonworkable, the proposed rescheduling can simply be automatically rejected and the original scheduling retained as originally displayed. By another approach, the proposed rescheduling can be retained but one or more of the scheduled stops can now be highlighted in some suitable fashion to alert the delivery person that at least these stops are negatively affected by the proposed rescheduling. In this case the delivery person can then decide whether to retain the rescheduling change or to undo the change (using, for example, an undo function button that can be displayed under these circumstances).

By another approach, in lieu of the foregoing or in combination therewith, these teachings will accommodate providing the delivery person with one or more free-text fields in which unstructured textual entries can be entered by the delivery person. Such a field can serve, for example, to receive explanatory information regarding why the delivery person could not successful effect delivery of a particular item to a particular customer. By one approach, such a field can comprise a static always-displayed part of the electronic driver trip sheet 500, with one such field (at the least) being displayed for each scheduled stop.

By another approach, and as illustrated in FIG. 8, a free text-entry field 801 can be temporarily displayed (for example, as part of a virtual keyboard 802). This can occur, for example, by having the delivery person double click, right click, or otherwise interact with a particular stop 803. By another approach, if desired, a button, icon, or the like can be provided to specifically call up such a field/virtual keyboard. So configured, the delivery person can enter textual information to explain the circumstances that prevented a particular scheduled delivery. For example, such entries might read: No one home; no one of suitable age available to receive; gate to property locked and no response to buzzer; viscous dog prevented access to porch; no safe parking available; and so forth. Such information can help provide a record to document and otherwise explain why a particular delivery was skipped or completed outside a designated delivery window.

Figure 9:
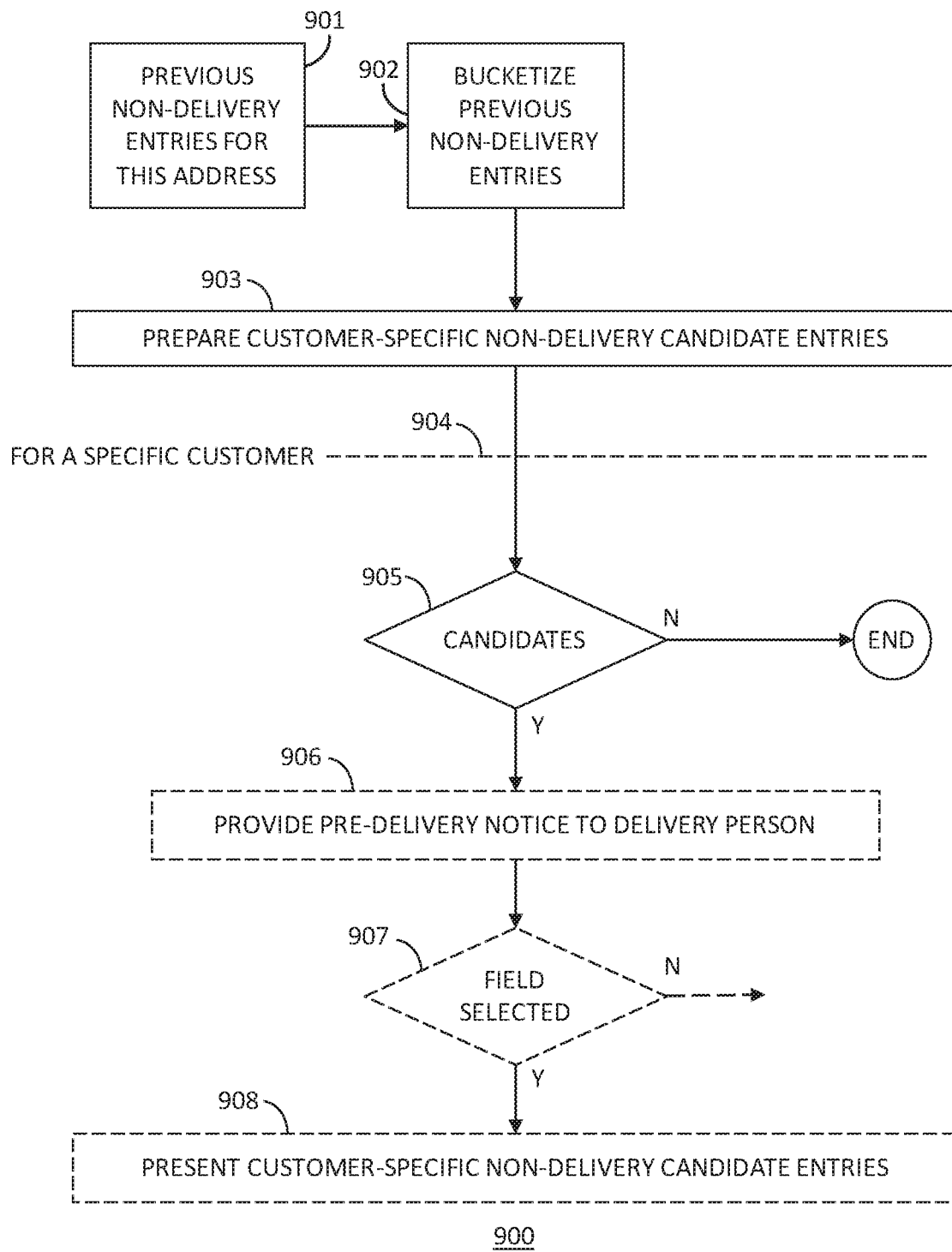
FIG. 9 comprises a flow diagram as configured in accordance with various embodiments of these teachings.

Such information can be leveraged in other ways as well if desired. By one approach, and as shown in FIG. 9, the aforementioned control circuit 401 and/or remote resource 404 can access various non-delivery entries 901 for given corresponding addresses as described above and automatically analyze those entries to thereby bucketize those previous entries (block 902) with respect to subject matter. That analysis can comprise, for example, a semantic sorting to facilitate grouping like entries (such as, for example, all entries that include the word "dog" or "unavailable" or "parking").

At block 903 this process 900 then provides for preparing customer-specific non-delivery candidate entries. As a simple example, a given customer address may have three non-delivery entries reading:

Viscous dog stopped me from entering yard.
Mean dog (Rottweiler) prevented delivery.
No one answered.

In such a case, the corresponding prepared customer-specific non-delivery candidate entries might read:

Dog prevented safe access to home.
No one responded to receive delivery.

Subsequently, and on a customer-by-customer basis (or an address-by-address basis, if desired) 904, this process 900 provides for determining whether any such candidate non-delivery entries are available at decision block 905. If not, the process 900 concludes for that particular customer. When such candidate entries are available for a particular customer, however, these teachings will accommodate leveraging that information in a variety of ways.

As one example in these regards, and as illustrated at optional block 906, one or more of the available candidate non-delivery entries can be provided (for example, via the aforementioned electronic driver trip sheet 500) to the delivery person on a customer-specific basis to serve as a pre-delivery notice regarding one or more potential delivery problems for that customer. Such information can be used by the delivery person to potentially attempt to ameliorate the concern of record (for example, by calling the customer to ensure that the condition of historical concern is presently not a factor or to ask the customer to take actions to abate the concern prior to the delivery).

As another example in these regards, and as illustrated at optional blocks 907 and 908, upon detecting that the delivery person has selected or otherwise enabled the above-described free text-entry function, the process 900 can respond by presenting (for example, in a pop-up sub-menu) on the display one or more of the available customer-specific non-delivery candidate entries. So configured, the delivery person can simply select one of the available entries that properly reflects the present problem and thereby more quickly, consistently, and accurately complete this data entry activity.

And at block 206 the control circuit 401 can generate content to display via the mobile user interface 303 by, at least in part, evaluating metrics (such as, but not limited to, recorded delivery metrics) against the set of rules. As one example in these regards, the set of rules can provide for automatically entering a present time into the time-out field when and only when the delivery person enters a valid entry into the "totes delivered" field (with or without a concurrent requirement that the delivery vehicle 303 have begun moving again as desired).

So configured, these teachings provide a number of useful benefits. In addition to eliminating, either largely or wholly, the use of paper trip sheets these teachings can help save considerable delivery-person time either via providing an easier user interface mechanism and/or by automatically entering at least some of the required information. In many cases the legibility and accuracy of the entered information is greatly improved as well. Furthermore, these teachings make it far easier to provide delivery information in a form readily suited to facilitate analysis, scheduling, and other purposes.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. An apparatus comprising:
   a delivery vehicle containing items to be delivered to each of a plurality of target recipients at different delivery addresses;
   a mobile user interface including a control circuit operably coupled with the delivery vehicle, the mobile user interface configured to present an interactive display that includes discrete information fields for:
   identifying information corresponding to the target recipients;
   predetermined delivery windows corresponding to each of at least some of the target recipients;
   actual delivery-time information corresponding to each of at least some of the target recipients, delivery-vehicle odometer information corresponding to when individual deliveries are made to at least some of the target recipients;
   affirmatively indicating whether a delivery occurred during the predetermined delivery window for individual ones of the target recipients;
   and indicating a number of totes that are delivered to individual ones of the target recipients;
   wherein information presented in at least some of the discrete information fields is automatically populated and wherein a user of the apparatus is permitted to modify a given item of automatically populated information provided the modification is limited to no more than some percentage or differential value as compared to the original entry; and
   wherein the delivery-vehicle odometer information field is automatically populated when the mobile user interface control circuit determines that the delivery vehicle has arrived at a particular target delivery address.

2. The apparatus of claim 1 wherein the delivery vehicle comprises a delivery truck.

3. The apparatus of claim 1 wherein the mobile user interface comprises a tablet-styled computer.

4. The apparatus of claim 1 wherein the mobile user interface comprises a touch-screen display that presents the discrete information fields.

5. The apparatus of claim 1 wherein the mobile user interface further includes a network interface such that the mobile user interface communicates information with a remote resource.

6. The apparatus of claim 5 wherein the communicated information comprises data to prepopulate into at least some of the discrete information fields.

7. The apparatus of claim 5 wherein the communicated information comprises completed-delivery-trip information provided by the mobile user interface to the remote resource.

8. A method comprising:
   providing a delivery vehicle containing items to be delivered to each of a plurality of target recipients at different delivery addresses;
   providing a mobile user interface including a control circuit operably coupled with the delivery vehicle;
   presenting, by the mobile user interface, an interactive display that includes discrete information fields for:
   identifying information corresponding to the target recipients;

predetermined delivery windows corresponding to each of at least some of the target recipients;

actual delivery-time information corresponding to each of at least some of the target recipients;

delivery-vehicle odometer information corresponding to when individual deliveries are made to at least some of the target recipients;

affirmatively indicating whether a delivery occurred during the predetermined delivery window for individual ones of the target recipients;

indicating a number of totes that are delivered to individual ones of the target recipients:

automatically populating information presented in at least some of the discrete information fields while permitting a user to modify a given item of automatically populated information provided the modification is limited to no more than some percentage or differential value as compared to the original entry; and wherein the delivery-vehicle odometer information field is automatically populated when the mobile user interface control circuit determines that the delivery vehicle has arrived at a particular target delivery address.

9. The method of claim 8 wherein the delivery vehicle comprises a delivery truck.

10. The method of claim 8 wherein the mobile user interface comprises a tablet-styled computer.

11. The method of claim 8 wherein the mobile user interface comprises a touch-screen display that presents the discrete information fields.

12. The method of claim 8 wherein the mobile user interface further includes a network interface such that the mobile user interface communicates information with a remote resource.

13. The method of claim 12 wherein the communicated information comprises data to prepopulate into at least some of the discrete information fields.

14. The method of claim 12 wherein the communicated information comprises completed-delivery-trip information provided by the mobile user interface to the remote resource.

* * * * *

UNITED STATES PATENT AND TRADEMARK OFFICE
CERTIFICATE OF CORRECTION

PATENT NO.       : 10,671,967 B2
APPLICATION NO.  : 15/581507
DATED            : June 2, 2020
INVENTOR(S)      : Kerry D. Melton et al.

It is certified that error appears in the above-identified patent and that said Letters Patent is hereby corrected as shown below:

In the Claims
Column 10, Line 21, in Claim 1, delete "recipients," and insert -- recipients; --, therefor.
Column 11, Line 12, in Claim 8, delete "recipients:" and insert -- recipients; --, therefor.

Signed and Sealed this
Thirteenth Day of October, 2020

Andrei Iancu
*Director of the United States Patent and Trademark Office*